United States Patent [19]

Taga

[11] Patent Number: 5,224,738
[45] Date of Patent: Jul. 6, 1993

[54] DOUBLE PIPING STRUCTURE

[76] Inventor: Jun Taga, 1-10 Minami-Ikuta, Tama-ku, Kawasaki-shi, Japan

[21] Appl. No.: 859,032

[22] Filed: Mar. 27, 1992

[51] Int. Cl.⁵ .............................................. F16L 55/00
[52] U.S. Cl. ..................................... 285/14; 285/21; 285/55; 285/915
[58] Field of Search ...................... 285/55, 915, 21, 14

[56] References Cited

U.S. PATENT DOCUMENTS

| | | | |
|---|---|---|---|
| 3,563,573 | 2/1971 | Crompton | 285/55 |
| 3,575,445 | 4/1971 | French | 265/55 X |
| 3,977,704 | 8/1976 | Meyer | 285/55 X |
| 4,277,091 | 7/1981 | Hunter | 285/55 |
| 4,856,828 | 8/1989 | Kessler et al. | 285/55 X |
| 4,865,356 | 9/1989 | Moore et al. | 285/55 |

FOREIGN PATENT DOCUMENTS 63-86490 6/1988 Japan .
3-110134 5/1991 Japan .

*Primary Examiner*—Dave W. Arola
*Attorney, Agent, or Firm*—Thomas R. Morrison

[57] ABSTRACT

A connecting structure of resinous double pipes, having an external pipe and an internal pipe coated on an inner surface of the external pipe. The connecting structure comprises respective ends of opposite two external pipes; respective U-shaped ends of opposite two internal pipes; a clamping member for sealing and fixing a side of the U-shaped end enclosing the end of the external pipe; a joint ring disposed between respective ends of two double pipes opposite each other, having the same outer diameter as the external pipe; a joint socket mounted on an outer surface of a pair of the double pipes jointed by the joint ring; a bead retaining gap formed between an inner surface of the joint socket and the clamping member; and a gasket disposed between a bottom of the U-shaped internal pipe and the end of the external pipe.

9 Claims, 3 Drawing Sheets ically in chemical plant or semiconductor manufacturing plant.

DOUBLE PIPING STRUCTURE

BACKGROUND OF THE INVENTION

This invention relates to a connecting structure of double pipes for carrying fluid, which is used mainly in chemical plant or semiconductor manufacturing plant.

In recent years, the integrating degree of an integrated circuit (IC) is being increased from 4M (Mega bit) to 16M and 64M. In its manufacturing process, the yield of the IC depends on how they can be free from a contaminated substance such as metal ion, total organic carbon (TOC) or the like that may occur from a piping where an ultrapure water is flowing.

The content of such contaminated substance in the ultra-pure water is now discussed in an order of PPB (parts per billion). Conventionally, the foregoing piping is made of a stainless steel, polyvinyl chloride (PVC), polyvinylidene fluoride (PVDF), polyether keton (PEEK), polyphenylene sulfide (PPS) or the like, but such material is not suitable for manufacturing ULSI having more than 4M, because the ultra-pure water is contaminated by such a substance as metal ion, TOC or the like. In lieu of the foregoing material, the piping may be made of tetrafluoroethylene (TFE) or copolymer of TFE and perfluoroalkylvinylether (PFA) that is a chemically most stable resin suitable for manufacturing the semiconductors.

When using a piping made of TFE or copolymer of TFE and PFA, the problem is that it has a low rigidity, a joint difficulty in heat fusion, a joint inability by adhesive, a costly price and like. For this reason, there are some unusual cases, in which an internal surface of a metal double pipe is treated with a lining of 1 or 5 mm which is made of TFE or copolymer of TFE and PFA. However, respective flanges of both lining-treated double pipes are fixed with each other by screw clamping, so that they are not suitable for the piping for carrying an ultra-pure water in the semiconductor manufacturing plant. Because it is easy that some germs may occur in a joint portion of the both double pipes. Further, the thermal expansion coefficient of metal differs greatly from that of such resinous lining. When heating and cooling are repeated frequently one after another, the lining may cause some creases or cracking due to expansion or shrinkage. Accordingly, it is not suitable for the semiconductor production to use such lining-treated double pipe.

OBJECTS AND SUMMARY OF THE INVENTION

It is therefore a general object of this invention to provide a connecting structure of resinous double pipes, which is very effective when carrying an ultra-pure water and can be produced at a low cost.

It is another object of this invention to provide a connecting structure of resinous double pipes, which can be produced by a conventional heat fusion or adhesion.

Briefly stated, this invention provides a connecting structure of resinous double pipes, having an external pipe and an internal pipe coated on an inner surface of the external pipe; the connecting structure comprising:
respective ends of two opposite external pipes;
respective U-shaped ends of opposite two internal pipes;
a clamping member for sealing and fixing a side of the U-shaped end enclosing the end of the external pipe;
a joint ring disposed between respective ends of two double pipes opposite each other, having the same outer diameter as the external pipe;
a joint socket mounted on an outer surface of a pair of the double pipes jointed by the joint ring;
a bead retaining gap formed between an inner surface of the joint socket and the clamping member; and
a gasket disposed between a bottom of the U-shaped internal pipe and the end of the external pipe.

Further, this invention provides a connecting structure of resinous double pipes, having an external pipe and an internal pipe coated on an inner surface of the external pipe, the connecting structure comprising:
a joint socket having a smaller inner periphery and a larger inner periphery, for fixing an end of one external pipe on the smaller inner periphery;
a sleeve having the same opening as the double pipe, fixed with a L-shaped end of the internal pipe to seal the smaller inner periphery of the joint socket;
a protrusion formed on an outer periphery of the other external pipe and associated with the larger inner periphery of the joint socket;
a clamping member fixed on a side of a U-shaped end of one internal pipe, the U-shaped end being extended to an end of the protrusion; and
a bead retaining gap formed between the larger inner periphery, the clamping member and the protrusion.

According to a feature of this invention, respective ends of two opposite double pipes are firmly jointed to each other not only by a conventional heat fusion, but also by a conventional adhesion using a solvent. The conventional adhesion is available for the double pipe having e.g. a PVC-made external pipe. To prevent a TOC content in the solvent from penetrating into the interior of the double pipe and expedite solidification of the solvent, the present double pipe is provided with means for removing the bead in the bead retaining gap.

The above, and other objects, features, and advantages of this invention will become apparent from the following description read in conjunction with the accompanying drawings, in which like reference numerals designate the same elements.

BRIEF DESCRIPTION OF THE ACCOMPANYING DRAWINGS

FIG. 1 is a section view of an embodiment.
FIG. 2 is a section view of an embodiment.
FIG. 3 is a section view of an embodiment.
FIG. 4 is a section view of an embodiment.
FIG. 5 is a section view of an embodiment.
FIG. 6 is a section view of an embodiment.

DETAILED DESCRIPTION OF THE PREFERRED EMBODIMENTS

Figure 1:
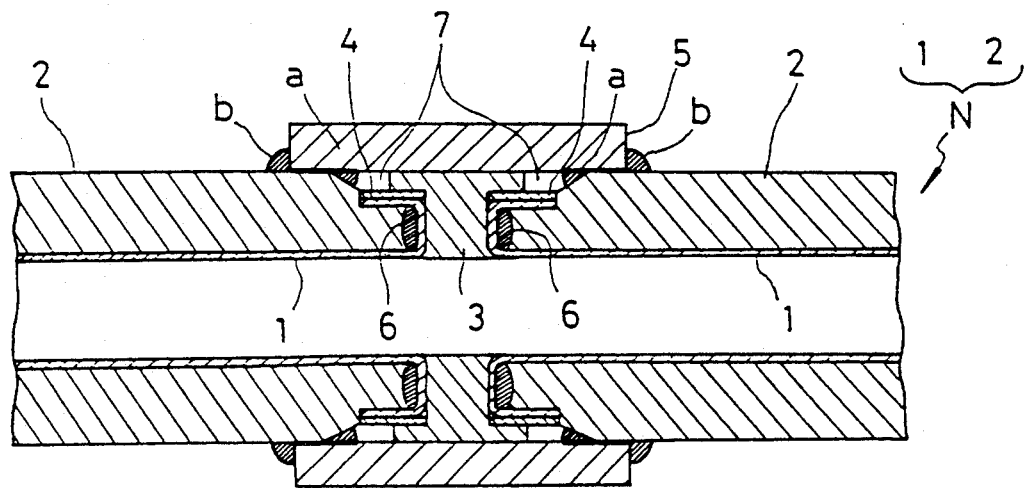

Referring to FIG. 1, a double pipe N comprises an internal pipe 1 having a thin thickness of e.g. 2.0 to 1 mm, which is made of PFA (copolymer of tetrafluoroethylene and perfluoroalkylvinylether) and an external pipe 2 of which inner surface has a lining made of polybutene having the same thermal expansion coefficient as PFA. External pipe 2 is made of polybutene, PVC or the like. Internal pipe 1 is tightly inserted into external pipe 2. A ring-shaped joint 3 is effective to joint respective ends of two double pipes N, N firmly. The external diameter of ring-shaped joint 3 is identical with that of double pipe N, and the internal diameter of the former is identical with that of the latter.

As disclosed in Japanese Laid-open Patent Publication No. 62-237192, a side surface of ring-shaped joint 3 may be provided with an annular lip seal to assure a perfect joint between ring-shaped joint 3 and two double pipes N, N. An end of external pipe 2 is slightly tapered, while an end of internal pipe 1 is formed in U-shape, and a farthest end of it is directed outwardly. The U-shaped inner pipe is fixed with a clamping ring member 4 which is made of a stainless steel. A top surface of ring-shaped joint 3 and a cylindrical socket 5 which is made of polybutene are jointed to each other by a thermal fusion to joint two opposite double pipes N, N. tighter. The melting point of PFA in the thermal fusion is about 300° C. and that of polybutene is 130° C.

A bead retaining gap 7 is formed between the end of external pipe 2, an end of ring-shaped ring 3 and clamping ring member 4. All beads a that occur constantly when treating cylindrical socket 5 and external pipe 2 with thermal fusion are to be kept in bead retaining gap 7 so that they cannot penetrate to the joint portion of two pipes 1, 2. An elastic ring gasket 6 is disposed on a bottom of U-shaped internal pipe 1 against respective ends of external pipe 2. A bead b which comes from a slight gap between external pipe 2 and joint socket 5 is not harmful at all and can be wiped away easily.

Figure 2:
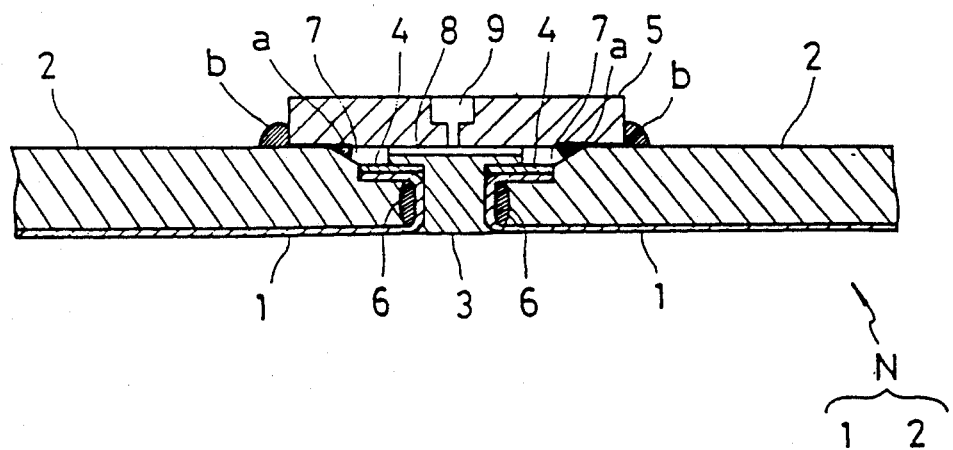

Referring now to FIG. 2 in case cylindrical socket 5 and external pipe 2 are made of polyvinyl chloride (PVC) which is dissolvable with a solvent, both of them can be adhered to each other by an adhesive agent solvent. It is a very simple and efficient adhesion. A thin groove 8 is formed axially on the top surface of ring-shaped joint 3, and communicated with bead retaining gap 7. A central path 9 in cylindrical socket 5 is communicated with groove 8. The bead retaining in gap 7 is sucked and deaerated by a suction device (not illustrated) by way of groove 8 and path 9. Cylindrical socket 5 and two opposite external pipes 2, 2 are adhered to each other by an adhesive agent. When the suction means is actuated, the solvent around bead retaining gap 7 is expedited to be evaporated, so that the joint portion is hardened promptly. Accordingly, it prevents any organic carbon contained in the solvent from being penetrated into the interior of double pipe N.

Figure 3:
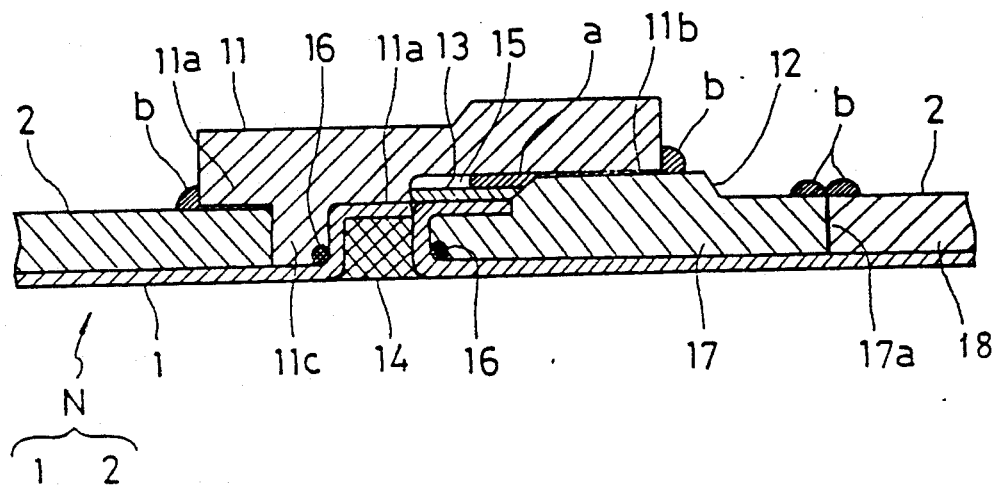

Referring to FIG. 3, numeral 11 is a polybutene-made joint socket which has a smaller internal periphery 11a a larger internal periphery 11b and a convex stopper 11c protruded from smaller internal periphery 11a. Convex stopper 11c of which height is identical with its opposite external pipe 2 is inserted in a gap between external pipe 2 and L-shaped inner pipe 1. Numeral 12 is a protrusion which contacts larger internal periphery 11b and is formed on an outer surface of rightside external pipe 2. Numeral 13 is a stainless steel ring for sealing hermetically and fixing an end of U-shaped rightside internal pipe 1.

In order to fix an end of leftside internal pipe 1 with smaller internal periphery 11a, a sleeve 14 having the same opening as internal pipe 1 is disposed in a gap between L-shaped end of leftside internal pipe 1 and a side wall of U-shaped rightside internal pipe 1. A bead retaining gap 15 is formed between larger internal periphery 11b, stainless steel ring 13 and protrusion 12.

Joint socket 11 is first of all fixed to joint respective ends of both double pipes N, N. Namely, an end of leftside external pipe 2 contacts convex stopper 11c along smaller internal periphery 11a, while L-shaped leftside internal pipe 1 is disposed around convex stopper 11c and an end of it is linked to an end of rightside internal pipe 2. L-shaped internal pipe 1 and U-shaped internal pipe 1 are fixed with each other by sleeve 14. Joint socket 11 is fixed with respective double pipes, N, N by means of thermal fusion. Bead a which occurs during the heat fusion is retained in a bead retaining gap 15. An external pipe segment 17 having protrusion 12 may be fixed with another external pipe segment 18 at a welded portion 17a. Numeral 16 is a resilient gasket.

Figure 4:
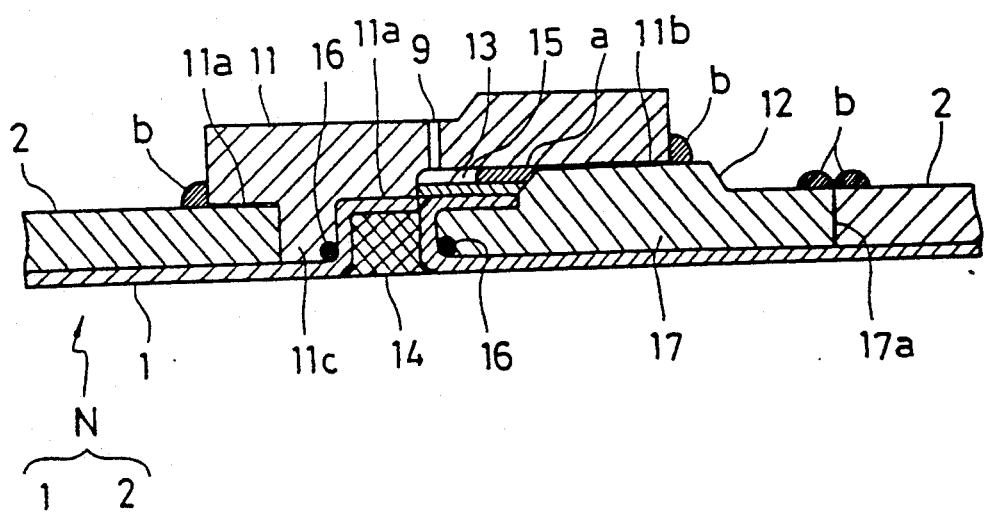

Referring to FIG. 4, joint socket 11 can be adhered effectively to the outer surface of external pipe 2. Numeral 9 is a path for removing bead a in gap 15 by actuating the suction device (not illustrated). Path 9 is formed in joint socket 11 and communicated with bead retaining gap 15.

Figure 5:
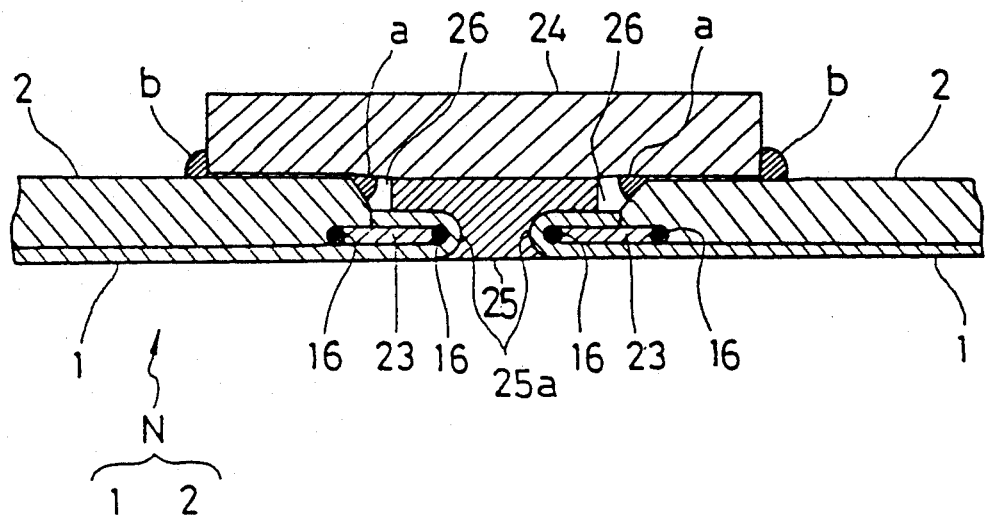

Referring to FIG. 5, internal pipe 1 is made of PFA and coated on a lining formed on the inner surface of external pipe 2. The lining is made of polybutene of which thermal expansion coefficient is identical with that of PFA.

Respective ends of two opposite double pipes have a symmetrical configuration and are jointed to each other by a sleeve 25 made of PFA, which is disclosed in Japanese Laid-open Patent Publication No. 62-237192. Sleeve 25 having the same outer diameter as external pipe 2 and the inner diameter as inner pipe 1 has a curved portion 25a, in which a U-shaped end of inner pipe 1 is fitted suitably. Two opposite external pipes 2, 2 and sleeve 25 are jointed firmly to each other by a joint socket 24. A stainless steel ring 23 is effective to support respective U-shaped ends of two internal pipes 1, 1. A bead retaining gap 26 is formed between a side of U-shaped end of internal pipe 1, an end of external pipe 2, joint socket 24 and sleeve 25. Joint socket 24 and two opposite external pipes are fixed with each other by means of thermal fusion. Beads a, a which occur at that time are retained in gap 26.

Figure 6:
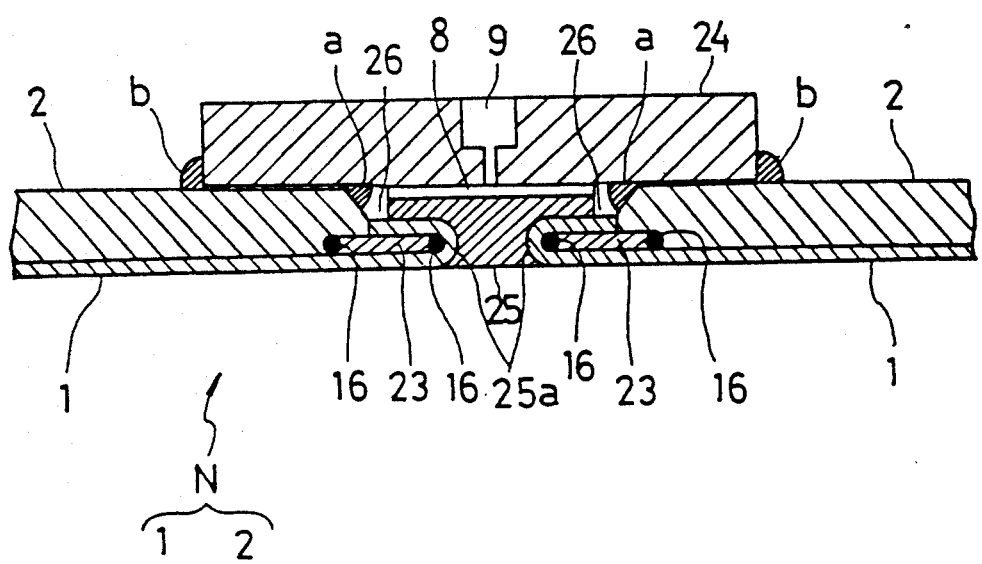

Referring to FIG. 6, joint socket 24 can be adhered to two external pipes 2, 2 by an adhesive agent.

A thin groove 8 is formed axially on a top of sleeve 25 and communicated with bead retaining gap 26. Path 9 is formed at a center of joint socket 24 and communicated with groove 8. Bead retaining gap 6, groove 8 and path 9 constitute means for removing all beads, which is connected to a suction device (not illustrated). Joint socket 24 and two opposite external pipes 2, 2 are adhered to each other by an adhesive agent. When the suction device is actuated, the adhesive agent is expedited to be vaporized and an adhered portion is solidified rapidly, thereby preventing a TOC content in the adhesive agent from being penetrated into the interior of double pipe N.

As discussed above, respective ends of double pipe N is fixed simply with each other by means of a conventional thermal fusion or adhesion. All beads that occur in that process are wiped away outside double pipe N and any solvent is prevented completely from penetrating into the interior of double pipe N.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A connecting structure of resinous double pipes comprising:
   first and second double pipes;
   each of said first and second double pipes including an external pipe having a first end, and an internal pipe having a U-shaped end;
   said external pipe joined to said internal pipe;
   first and second clamping members;
   said U-shaped end of said internal pipe enclosing said end of said external pipe;
   said first and second clamping members disposed around said U-shaped end of said internal pipe of said first and second double pipe and including means for sealing said U-shaped end to said external pipe, respectively;
   a joint ring disposed between said first and second double pipes;
   said joint ring having a same outer diameter as said external pipe and a same inner diameter as said inner pipe;
   said joint ring including means for joining said joint ring to said first and second double pipes;
   a joint socket;
   said joint socket mounted on an outer surface of said first and second double pipes and said joint ring;
   means for permitting fusing said joint socket with said joint ring and said first and second double pipes;
   first and second bead retaining gaps formed between an inner surface of said joint socket and said first and second clamping members respectively; and
   said first and second bead retaining gaps including means for receiving a bead produced in response to said means for permitting fusing.

2. A connecting structure of resinous double pipes as claimed in claim 1, further comprising:
   said joint socket including a central path;
   said joint ring including a groove;
   said central path being in communication with said groove;
   said groove being in communication with said pair of bead retaining gaps; and
   means for removing a gas evaporated from said bead from said pair of bead retaining gaps through a path formed by said groove and said central path.

3. A connecting structure of resinous double pipes comprising:
   first and second double pipes;
   said first and second double pipes including first and second external pipes, respectively;
   said second external pipe including a protrusion;
   said first double pipe including a first internal pipe with a L-shaped end;
   said second double pipe including a second internal pipe with a U-shaped end;
   said first and second external pipes separated from said first and second internal pipes;
   a clamping member disposed around said U-shaped end;
   said clamping member including means for sealing said U-shaped end of said second internal pipe to said end of said second external pipe;
   a joint socket mounted on an outer surface of said double pipes including first and second inner peripheries;
   said first inner periphery being smaller than said second inner periphery and including a stopper positioned between said first internal pipe and said L shaped end;
   a sleeve having a same inner and outer diameter of said L shaped end of said first internal pipe and positioned between said L shaped end and said U shaped end;
   said sleeve including means for affixing said first internal pipe to said second internal pipe;
   said first inner periphery contacting said first external pipe;
   said second inner periphery contacting said protrusion;
   a bead retaining gap formed by said second inner periphery, said clamping member and said protrusion;
   means for permitting fusing of said joint socket to said double pipes; and
   said bead retaining gap including a means for receiving a bead produced in response to said means for permitting fusing.

4. A connecting structure of resinous double pipes as claimed in claim 3, further comprising:
   said joint socket including a central path;
   said central path being in communication with said bead retaining gap; and
   means for removing a gas evaporated from said bead from said bead retaining gap through said central path.

5. A connecting structure of resinous double pipes comprising:
   first and second double pipes;
   each of said first and second double pipes including an external pipe having an end, and an internal pipe having a U-shaped end;
   first and second supporting rings;
   said external pipe being joined to said internal pipe;
   said first and second supporting rings including means for supporting said U-shaped ends;
   a sleeve having a same outer diameter of said external pipe and a same inner diameter as said inner pipe;
   said sleeve having curved portions to receive said U-shaped ends of each of first and second double pipes;
   a joint socket mounted on an outer surface of said first and second double pipes and said sleeve;
   said joint socket including means for joining said first and second double pipes with said sleeve;
   first and second bead retaining gaps formed by said U-shaped end and said external pipe of each of said first and second double pipes, said joint socket and said sleeve;
   means for permitting fusing of said joint socket to said first and second double pipes and said sleeve; and
   said first and second bead retaining gaps including means for receiving a bead produced in response to said means for permitting fusing.

6. A connecting structure of resinous double pipes as claimed in claim 5, further comprising:
   said joint socket including a central path;
   said sleeve including a groove;
   said central path being in communication with said groove;
   said groove being in communication with said pair of bead retaining gaps; and
   means for removing a gas evaporated form said bead from said pair of bead retaining gap through a path formed by said groove and said central path.

7. A connecting structure of resinous double pipes comprising:
   first and second double pipes;

each of said first and second double pipes including first and second internal pipes, and first and second external pipes having a first end, respectively;

at least one of said first and second internal pipes having a U-shaped end;

said external pipe joined to said internal pipe;

at least one ring member;

said U-shaped end of said at least one of said first and second internal pipes enclosing a portion of said first and second external pipes;

said at least one ring member including means for sealing said U-shaped end to said portion of said first and second external pipe;

a socket;

said socket having a same inner diameter as said inner pipe;

said socket mounted on an outer surface of said first and second double pipe and between said first and second external pipes;

means for permitting fusing of said socket with said first and second double pipes;

at least one fluid retaining gap formed between an inner surface of said joint socket and said at least one ring member, respectively; and said at least one fluid retaining gap including means for holding fluid in response to said means for permitting fusing.

8. An apparatus according to claim 7, further comprising:

a path effective for communicating said at least one fluid retaining gap to the exterior of said socket; and means for applying negative pressure to said at least one fluid retaining gap through said path effective for removing fluid from said at least one fluid retaining gap.

9. An apparatus according to claim 7, further comprising:

said socket including a joint socket and a joint ring; and means for permitting fusing of said joint socket and said joint ring.

* * * * *